(12) United States Patent
Plamondon et al.

(10) Patent No.: US 12,203,429 B2
(45) Date of Patent: Jan. 21, 2025

(54) AIRCRAFT POWER PLANT WITH DETONATION COMBUSTION TUBE

(71) Applicant: PRATT & WHITNEY CANADA CORP., Longueuil (CA)

(72) Inventors: Etienne Plamondon, Candiac (CA); Michel Bousquet, Longueuil (CA); Kevin Nguyen, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/066,302

(22) Filed: Dec. 15, 2022

(65) Prior Publication Data
US 2024/0200510 A1 Jun. 20, 2024

(51) Int. Cl.
*F02K 3/10* (2006.01)
*F01C 1/22* (2006.01)
*F01C 11/00* (2006.01)
*F02C 3/14* (2006.01)
*F02C 6/12* (2006.01)

(52) U.S. Cl.
CPC ............... *F02K 3/10* (2013.01); *F01C 1/22* (2013.01); *F01C 11/008* (2013.01); *F02C 3/14* (2013.01); *F02C 6/12* (2013.01); *F05D 2220/80* (2013.01)

(58) Field of Classification Search
CPC ...... F02K 3/10; F02K 7/02; F01C 1/22; F01C 11/008; F02C 3/14; F02C 3/34; F02C 5/00; F02C 5/02; F02C 6/12; F05D 2220/80; F23R 3/346; F23R 2900/03341; F23R 7/00; F23C 6/04; F23C 6/042; F23C 6/045; F23C 6/047
See application file for complete search history.

(56) References Cited

U.S. PATENT DOCUMENTS 3,077,867 A * 2/1963 Walter ............... F02B 53/00
418/210
3,676,999 A * 7/1972 Oldfield ............ F02B 37/166
60/599

(Continued)

OTHER PUBLICATIONS

Search report issued in counterpart European application No. 23217233.8 on Apr. 19, 2024.

*Primary Examiner* — Loren C Edwards
(74) *Attorney, Agent, or Firm* — NORTON ROSE FULBRIGHT CANADA LLP (57) ABSTRACT

An aircraft power plant, has: a combustion engine having an outlet outputting combustion gases; a turbine downstream of the combustion engine; a detonation combustion tube fluidly connecting the combustion engine to the turbine; a member having an open position in which the outlet of the combustion engine is fluidly connected to the turbine and a closed position in which the combustion engine is fluidly disconnected from the turbine; a fuel injector fluidly connected to the detonation combustion tube; an igniter operatively connected to the detonation combustion tube; and a controller operatively connected to the fuel injector and to the igniter, the controller configured to, in response to receiving of a command: inject fuel into the detonation combustion tube via the fuel injector, and once the member is in the closed position, power the igniter to ignite a mixture of the combustion gases and the fuel into the detonation combustion tube.

20 Claims, 5 Drawing Sheets

(56) References Cited

U.S. PATENT DOCUMENTS

| | | | |
|---|---|---|---|
| 5,381,659 A * | 1/1995 | Loving | F01N 1/084 60/303 |
| 7,520,123 B2 | 4/2009 | Saddoughi et al. | |
| 8,783,008 B2 | 7/2014 | Eroglu et al. | |
| 11,320,147 B2 | 5/2022 | Pal et al. | |
| 2011/0099979 A1* | 5/2011 | Xu | C10L 1/1811 44/322 |
| 2014/0338348 A1 | 11/2014 | Pomerleau et al. | |
| 2018/0179951 A1 | 6/2018 | Tangirala et al. | |
| 2021/0140641 A1 | 5/2021 | Singh et al. | |
| 2021/0164405 A1 | 6/2021 | Haynes et al. | |
| 2022/0243667 A1 | 8/2022 | Rambo | |
| 2022/0290864 A1 | 9/2022 | Pal et al. | |

* cited by examiner

AIRCRAFT POWER PLANT WITH DETONATION COMBUSTION TUBE

TECHNICAL FIELD

The application relates generally to aircraft engines and, more particularly, to interburner used in such engines.

BACKGROUND

In aircraft applications, the power output capacity of an engine relative to the weight of the engine is an important factor that may affect an overall efficiency of the aircraft since the weight of the engine must be carried by the aircraft during flight. Aircraft engines may be required to have a maximum power output rating that can be produced during short-term (i.e., momentary) peak power operation in situations such as during take-off or during emergency situations. Even though, the long-term continuous operation of the aircraft engines during a cruise phase of flight, for example, can be well below such maximum power output rating, the maximum power output rating can necessitate increased size and weight of aircraft engines. Improvements are desirable.

SUMMARY

In one aspect, there is provided an aircraft power plant, comprising: a combustion engine having an outlet outputting combustion gases; a turbine located downstream of the combustion engine relative to the combustion gases; a detonation combustion tube fluidly connecting the combustion engine to the turbine; a member having an open position in which the outlet of the combustion engine is fluidly connected to the turbine through the member and a closed position in which the combustion engine is fluidly disconnected from the turbine by the member; a fuel injector fluidly connected to the detonation combustion tube downstream of the outlet of the combustion engine; an igniter located downstream of the member and operatively connected to the detonation combustion tube; and a controller operatively connected to the fuel injector and to the igniter, the controller configured to, in response to receiving of a command: inject fuel into the detonation combustion tube via the fuel injector, and once the member is in the closed position, power the igniter to ignite a mixture of the combustion gases and the fuel injected into the detonation combustion tube.

The aircraft power plant described above may include any of the following features, in any combinations.

In some embodiments, the controller is configured to: inject the fuel into the detonation combustion tube at fuel injection events in which fuel is injected into the detonation combustion tube via the fuel injector, the fuel injection events occurring at an injection frequency corresponding to a pulse frequency of pulses of the combustion gases generated by the combustion engine and entering the detonation combustion tube, the fuel injection events occurring between the pulses of the combustion gases.

In some embodiments, the controller is operatively connected to the member and configured to: move the member between the open position and the closed position at a frequency corresponding to the injection frequency.

In some embodiments, the member is a thrust wall having a first disc defining at least one first aperture and a second disc defining at least one second aperture, the first disc rotatable relative to the second disc, the at least one first aperture being in register with the at least one second aperture in the open position, the at least one first aperture being circumferentially offset from the at least one second aperture in the closed position.

In some embodiments, the first disc is drivingly engaged to the combustion engine.

In some embodiments, the first disc is drivingly engaged to the combustion engine via a gearbox.

In some embodiments, the controller is operatively connected to member via the gearbox, the controller being configured to: determine a required speed ratio between the first disc and a shaft of the combustion engine such that a frequency at which the member moves from the open position to the closed position corresponds to the pulse frequency of the pulses of the combustion gases generated by the combustion engine; and operate the gearbox at the required speed ratio.

In some embodiments, the combustion engine includes a plurality of rotary engine units, a manifold having a plurality of manifold inlets fluidly connected to a manifold outlet, each of the plurality of rotary engine units fluidly connected to a respective one of the plurality of manifold inlets, the manifold outlet fluidly connected to an inlet of the detonation combustion tube.

In some embodiments, the fuel injector is an electrically-controllable injector.

In some embodiments, the fuel injector is located upstream of the member.

In some embodiments, the controller is configured to: operate the combustion engine at an air-fuel equivalence ratio being greater than one.

In some embodiments, the detonation combustion tube is devoid of a dedicated air inlet.

In another aspect, there is provided a method of operating an aircraft power plant having a detonation combustion tube fluidly connecting a combustion engine to a turbine, the method comprising: generating combustion gases with the combustion engine; receiving the combustion gases generated by the combustion engine into the detonation combustion tube; injecting fuel into the detonation combustion tube; fluidly disconnecting the detonation combustion tube from the combustion engine; igniting a mixture of the combustion gases and the fuel received into the detonation combustion tube to detonate the mixture thereby generating a pulse of exhaust gases; and extracting energy from the pulse of the exhaust gases with the turbine.

The method described above may include any of the following features, in any combinations.

In some embodiments, the receiving of the combustion gases includes receiving pulses of the combustion gases at a pulse frequency, the injecting of the fuel into the detonation combustion tube includes injecting the fuel into the detonation combustion tube at fuel injection events having an injection frequency corresponding to the pulse frequency, the fuel injection events occurring between the pulses of the combustion gases.

In some embodiments, the fluidly disconnecting of the detonation combustion tube from the combustion engine includes moving a member from an open position in which in which an outlet of the combustion engine is fluidly connected to the turbine to a closed position in which the combustion engine is fluidly disconnected from the turbine by the member.

In some embodiments, the member is a thrust wall having a first disc defining at least one first aperture and a second disc defining at least one second aperture, the moving of the member from the open position to the closed position includes rotating the first disc relative to the second disc until the at least one first aperture is offset from the at least one second aperture.

In some embodiments, the first disc is drivingly engaged to the combustion engine via a gearbox, the method comprising determining a speed ratio between the first disc and a shaft of the combustion engine such that a frequency at which the member moves from the open position to the closed position corresponds to a pulse frequency of the pulses of the combustion gases generated by the combustion engine, and operating the gearbox at the speed ratio In some embodiments, the receiving the combustion gases generated by the combustion engine into the detonation combustion tube includes converging the combustion gases outputted by a plurality of rotary engine units into the detonation combustion tube.

In some embodiments, the generating of the combustion gases includes generating the combustion gases by operating the combustion engine at an air-fuel equivalence ratio being greater than one.

In some embodiments, the method includes injecting air into the detonation combustion tube solely through the combustion engine, the air being excess air present in the combustion gases.

BRIEF DESCRIPTION OF THE DRAWINGS

Reference is now made to the accompanying figures in which.

DETAILED DESCRIPTION

Figure 1:
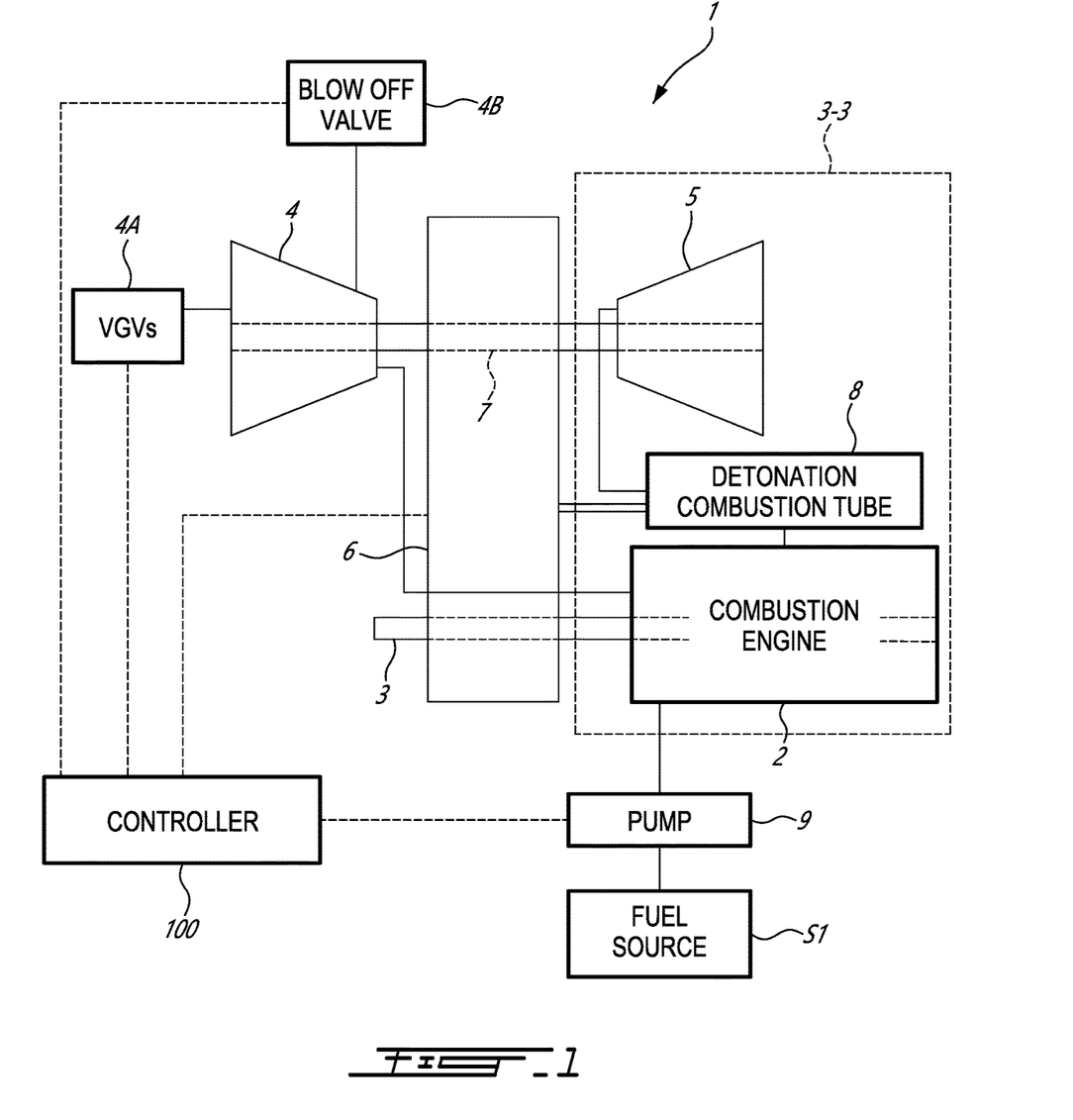
FIG. 1 is a schematic view of an aircraft power plant in accordance with one embodiment.

Referring to FIG. 1, an aircraft power plant 1 is generally shown and includes an internal combustion engine, referred to be below as a combustion engine 2 or as a thermal engine. In a particular embodiment, the combustion engine 2 comprises one or more rotary units each configured for example as a Wankel engine, or one or more reciprocating pistons. The combustion engine 2 drives a shaft 3, which may be referred to as an output shaft, that is used for driving a rotatable load (not shown). It is understood that the aircraft power plant 1 may alternatively be configured to drive any other appropriate type of load, including, but not limited to, one or more generator(s), propeller(s), accessory(ies), rotor mast(s), compressor(s), or any other appropriate type of load or combination thereof. In a particular embodiment, the combustion engine 2 is a rotary engine as will be described below. The combustion engine 2 may be a rotary engine or a piston engine. Any engine having a combustion chamber of varying volume may be used.

In a particular embodiment, the aircraft power plant 1 is a compound cycle engine system or compound cycle engine such as described in Lents et al.'s U.S. Pat. No. 7,753,036 issued Jul. 13, 2010 or as described in Julien et al.'s U.S. Pat. No. 7,775,044 issued Aug. 17, 2010, or as described in Thomassin et al.'s U.S. patent publication No. 2015/0275749 published Oct. 1, 2015, or as described in Bolduc et al.'s U.S. patent publication No. 2015/0275756 published Oct. 1, 2015, the entire contents of all of which are incorporated by reference herein. The aircraft power plant 1 may be used as a prime mover engine, such as on an aircraft or other vehicle, or in any other suitable application.

In the embodiment shown, the aircraft power plant 1 includes a compressor 4 for compressing the air before it is fed to an air inlet of the combustion engine 2, and a turbine 5 receiving the combustion gases from the combustion engine 2. It is understood that variations are possible, and that, for example, the compressor 4 may be omitted. The compressor 4 and the turbine 5 may each comprise one or more turbine stages, each including a rotor and a stator. The compressor 4 may be an axial compressor or a radial compressor. The turbine 5 may be an axial turbine or a radial turbine. Any suitable configurations are contemplated.

In the illustrated embodiment, the combustion engine 2, the compressor 4, and the turbine 5 are in driving engagement with a gearbox 6. The gearbox 6 is configured to allow the turbine 5 to compound power with the shaft 3 of the combustion engine 2 and to allow the turbine 5 and/or the combustion engine 2 to drive the compressor 4. The turbine 5 may thus help the combustion engine 2 in driving the rotatable load. In other embodiments, the turbine 5 may drive solely the compressor 4 or may drive other accessories (e.g., generator, pump, etc).

In the illustrated embodiment, the compressor 4 and the turbine 5 are in a driving engagement with the gearbox 6. In the illustrated embodiment, compressor and turbine rotors are engaged to a same turbine shaft 7, which is drivingly engaged to the shaft 3 of the combustion engine 2 through the gearbox 6. Herein, the turbine shaft 7 and the shaft 3 are parallel and radially offset from one another. However, alternate configurations are possible, including, but not limited to, the rotor(s) of the compressor 4 being engaged to a shaft separate from the turbine shaft 7 (whether coaxial with the turbine shaft 7, with the shaft 3, or offset from both) and in driving engagement with the turbine shaft 7 and/or the shaft 3, for example through the gearbox 6; and/or two or more of the shafts extending at an angle (perpendicularly or otherwise) to each other. Any suitable configurations are contemplated.

In the illustrated embodiment, an exhaust of the combustion engine 2 (corresponding to or communicating with an exhaust port of a respective rotary engines/reciprocating pistons of the combustion engine 2) is in fluid communication with the turbine 5 through a detonation combustion tube 8. The detonation combustion tube 8 is configured to increase a temperature and pressure of the exhaust gases such that more power can be extracted by the turbine 5 and thus transferred to the shaft 3 via the gearbox 6. The detonation combustion tube 8 is described below in greater detail with reference to FIG. 3.

In the embodiment shown, the combustion engine 2 is fluidly connected to a fuel source S1 through a pump 9, which may be operatively connected to a controller 100. The controller 100 may power the pump 9 to vary a mass flow rate of fuel supplied from the fuel source S1 to the combustion engine 2. It will be appreciated that other components, such as pressure regulating valve, and so on may be present even if not illustrated in FIG. 1. The pump 9 may be a gear pump and may be operated at a plurality of speeds each corresponding to a respective mass flow rate of fuel.

The compressor 4 may include variable guide vanes (VGVs) 4A pivotable about respective spanwise axes and controllable to change a flow of air through the compressor 4. In the embodiment shown, the VGVs 4A are variable inlet guide vanes since they are located upstream of an upstream-most of the rotor(s) of the compressor 4. However, the VGVs may be located at any suitable location within the compressor 4. The controller 100 may be operatively connected to an actuator drivingly engaged to the VGVs 4A to pivot the VGVs 4A. In some embodiments, the VGVs 4A may be omitted.

Still referring to FIG. 1, a blow off valve 4B may be operatively connected to the compressor 4. The blow off valve 4B may be an actuated valve (e.g., servo valve) operatively connected to the controller 100. The blow off valve 4B may be used to bleed air out of the compressor 4. The blow off valve 4B may be fluidly connected at any suitable locations on the compressor 4. In some embodiments, a waste gate on the exhaust side may also be used for that purpose.

Figure 2:
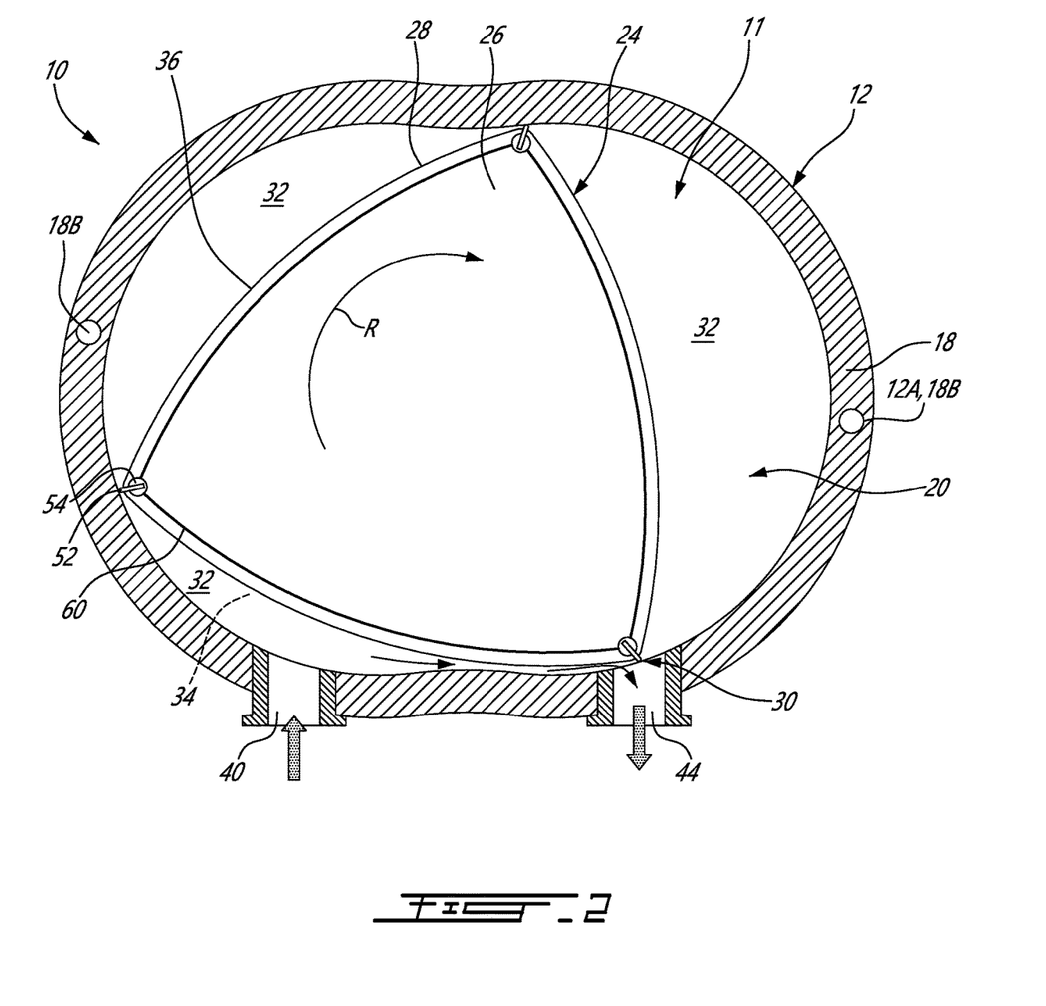
FIG. 2 is a schematic cross-sectional view of a rotary internal combustion engine in accordance with one embodiment that may be used as part of the aircraft power plant of FIG. 1.

Referring now to FIG. 2, the combustion engine 2 may be a rotary internal combustion engine, referred to simply as a rotary engine 10 below, is illustrated. The rotary engine 10 may be a Wankel engine. The rotary engine 10 comprises an outer body 12 having axially-spaced side housings 11, with a peripheral wall 18 extending from one of the side housings 11 to the other, to form a rotor cavity 20. The inner surface of the peripheral wall 18 of the cavity 20 has a profile defining two lobes, which may be an epitrochoid.

The outer body 12 includes a coolant circuitry 12A, which may include a plurality of coolant conduits 18B defined within the peripheral wall 18. As shown more clearly in FIG. 5, the coolant conduits 18B extends from one of the side housings 11 to the other. The coolant circuitry 12A is used for circulating a coolant, such as water or any suitable coolant, to cool the outer body 12 during operation of the rotary engine 10. Although only two coolant conduits 18B are shown, it is understood that more than two coolant conduits 18B may be used without departing from the scope of the present disclosure.

An inner body or rotor 24 is received within the rotor cavity 20. The rotor 24 has axially spaced end faces 26 adjacent to the side housings 11, and a peripheral face 28 extending therebetween. The peripheral face 28 defines three circumferentially-spaced apex portions 30, and a generally triangular profile with outwardly arched sides 36. The apex portions 30 are in sealing engagement with the inner surface of peripheral wall 18 to form three rotating combustion chambers 32 between the rotor 24 and outer body 12. The geometrical axis of the rotor 24 is offset from and parallel to the axis of the outer body 12.

The combustion chambers 32 are sealed. In the embodiment shown, each rotor apex portion 30 has an apex seal 52 extending from one end face 26 to the other and biased radially outwardly against the peripheral wall 18. An end seal 54 engages each end of each apex seal 52 and is biased against the respective side housings 11. Each end face 26 of the rotor 24 has at least one arc-shaped face seal 60 running from each apex portion 30 to each adjacent apex portion 30, adjacent to but inwardly of the rotor periphery throughout its length, in sealing engagement with the end seal 54 adjacent each end thereof and biased into sealing engagement with the side housings 11. Alternate sealing arrangements are also possible.

Although not shown, the rotor 24 is journaled on an eccentric portion of a shaft such that the shaft rotates the rotor 24 to perform orbital revolutions within the rotor cavity 20. The shaft may rotate three times for each complete rotation of the rotor 24 as it moves around the rotor cavity 20. Oil seals are provided around the eccentric to impede leakage flow of lubricating oil radially outwardly thereof between the respective rotor end face 26 and side housings 11. During each rotation of the rotor 24, each chamber 32 varies in volumes and moves around the rotor cavity 20 to undergo the four phases of intake, compression, expansion and exhaust, these phases being similar to the strokes in a reciprocating-type internal combustion engine having a four-stroke cycle.

The engine includes a primary inlet port 40 in communication with a source of air, an exhaust port 44, and an optional purge port also in communication with the source of air (e.g. a compressor) and located between the inlet and exhaust ports 40, 44. The ports 40, 44 may be defined in the side housings 11 or in the peripheral wall 18. In the embodiment shown, the ports 40, 44 are defined in the peripheral wall 18. Alternate configurations are possible.

In a particular embodiment, fuel such as kerosene (jet fuel) or other suitable fuel is delivered into the chamber 32 through a fuel port (not shown) and a fuel-air mixture may be ignited within the outer body 12 using any suitable ignition system known in the art (e.g. spark plug, glow plug). In a particular embodiment, the rotary engine 10 operates under the principle of the Miller or Atkinson cycle, with its compression ratio lower than its expansion ratio, through appropriate relative location of the primary inlet port 40 and exhaust port 44.

Figure 3:
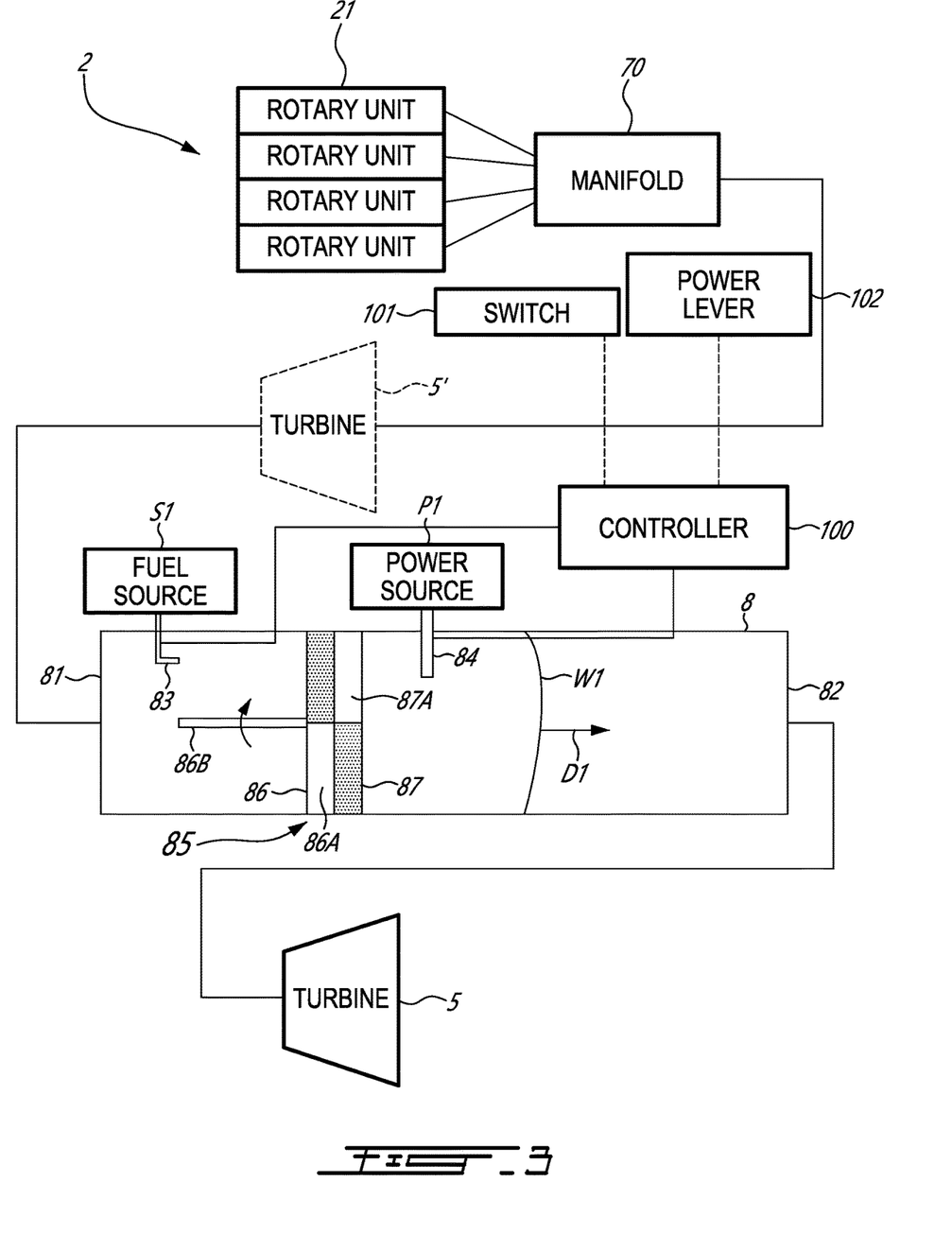
FIG. 3 is an enlarged view of zone 3-3 of FIG. 1 illustrating the detonation combustion tube in greater detail.

Referring now to FIG. 3, in the embodiment shown, the combustion engine 2 includes a plurality of rotary units 21 each in driving engagement with the shaft 3 (FIG. 1). Each of the rotary units 21 includes a respective outlet via which combustion gases are outputted. Although four rotary units 21 are shown, more or less than four rotary units 21 may be used without departing from the scope of the present disclosure. By nature of the rotary units 21, the combustion gases are outputted as pulses of combustion gases. These pulses may have a pulse frequency that may vary as a function of a rotational speed of their respective rotors. A manifold 70 has a plurality of manifold inlets each fluidly connected to a respective one of the outlets of the rotary units 21. The manifold 70 has a manifold outlet outputting a combined flow of the combustion gases of all of the rotary units 21. In other words, the manifold 70 collects the combustion gases from the rotary units and converges them into a single outlet, which is fluidly connected to the detonation combustion tube 8.

The detonation combustion tube, referred below simply as DCT 8, includes an inlet 81 fluidly connected to the outlet of the manifold 70, and an outlet 82 fluidly connected to an inlet of the turbine 5. The DCT 8 therefore fluidly connects the combustion engine 2 to the turbine 5.

The DCT 8 is configured to receive the combustion gases of the combustion engine 2, to mix these combustion gases with additional fuel directly injected into the DCT 8, and to ignite a mixture of the injected fuel and the combustion gases to generate exhaust gases that are then supplied to the turbine 5, which extract power form these exhaust gases. The DCT 8 therefore may increase an energy (e.g., enthalpy) of the combustion gases of the combustion engine 2 so that more energy may be extracted from the turbine 5. Thus, more power may be provided from the turbine 5 to the output shaft 3, herein via the gearbox 6. For a combustion engine that operates at an air fuel ratio above stoichiometry as will be described below, the remaining available oxygen in the exhaust stream may be leveraged for further combustion stage The DCT 8 includes a fuel injector 83 fluidly connected to the fuel source S1, or to a secondary fuel source, and includes an igniter 84 operatively connected to a power source P1 (e.g., battery, generator). The fuel injector 83 may be an electrically-controllable injector as defined in U.S. Pat. No. 11,111,848, the entire contents of which is incorporated herein by reference. The fuel injector 83 may be a common rail injector, a PFI injector, a GDI injector, and so on. The fuel injector 83 and the igniter 84 are operatively connected to the controller 100. The controller 100 is therefore configured to inject fuel in to the DCT 8 via the fuel injector 83 and to ignite a mixture of the fuel injected via the fuel injector 83 and the combustion gases received from the combustion engine 2 with the igniter 84. The fuel injector 83 and the igniter 84 are located downstream of the outlet of the combustion engine 2. Thus, the fuel injector 83 and the igniter 84 are different than injectors and igniters used in the combustion engine 2. The DCT 8 may be further equipped with a diluting tunnel or a swirler to ensure proper mixing of the fuel and the combustion gases before ignition.

The DCT 8 is configured to create a detonation of the mixture of the fuel and the combustion gases. This detonation creates a shock wave W1 that propagates at supersonic speeds along the DCT 8 in direction D1 away from the inlet 81 of the DCT 8 and towards the outlet 82 of the DCT 8. This shock wave W1 therefore creates a pulse of exhaust gases that periodically flow out of the DCT 8 to meet the turbine 5. The turbine 5 may therefore be an impulse turbine configured to extract energy from such pulses of exhaust gases. A scroll inlet may be used to inject the exhaust gases into the turbine 5.

Typical combustion chambers in gas turbine engines will combust via deflagration, which features a subsonic flame front that advances by diffusion. Detonation is a different type of combustion that involves a supersonic flame front accelerating through a medium that eventually drives a shock front propagating directly in front of it. Deflagration and detonation waves differ by structure and characteristic velocity. Deflagration features a subsonic flame front that advances by diffusion of heat and species. In contrast, detonation is a layered structure of a leading shockwave, subsonic combustion, and thermal choke followed by a supersonic expansion. The entire sandwich is driven through the reactants at supersonic or even hypersonic speeds.

More specifically, a deflagration is characterized by a subsonic flame propagation velocity, typically far below 100 metres per second, and relatively modest overpressures, typically below 50 kilopascals. The main mechanism of combustion propagation is of a flame front that moves forward through the gas mixture. In technical terms the reaction zone (chemical combustion) progresses through the medium by processes of diffusion of heat and mass. In its most benign form, a deflagration may simply be a flash fire.

In contrast, a detonation is characterized by supersonic flame propagation velocities, perhaps up to 2,000 metres per second or more, and substantial overpressures, up to 2 MPa or more. The main mechanism of detonation propagation is of a powerful pressure wave that compresses the unburnt gas ahead of the wave to a temperature above the auto-ignition temperature. In technical terms, the reaction zone (chemical combustion) is a self-driven shock wave where the reaction zone and the shock are coincident, and the chemical reaction is initiated by the compressive heating caused by the shock wave.

In some embodiments, detonation occurs when some conditions are present. These conditions are linked to the mixture state, such as pressure, temperature, and density, and linked to the mixture composition, such as the air-fuel equivalence ratio.

Still referring to FIG. 3, in the embodiment shown, a member 85 is disposed within the DCT 8 and is used to selectively allow or block fluid communication between the combustion engine 2 and the turbine 5. This member 85 is used to prevent the shock wave W1 from propagating backwards towards the combustion engine 2, which could damage said engine. The member 85 thus has an open position in which the outlet of the combustion engine 2 is fluidly connected to the turbine 5 through the member 85 and a closed position in which the combustion engine 2 is fluidly disconnected from the turbine 5 by the member 85. The member 85 may be a valve (e.g., check valve). If the combustion engine is a piston engine, the member may correspond to a valve of the piston engine; the valve operable to allow air an fuel to enter a combustion chamber of said engine and to allow combustion gases to exit the combustion chamber. The fuel injector 83 may be located upstream or downstream of the member 85 relative to the flow of the combustion gases entering the DCT 8.

In the present embodiment, the member 85 is a thrust wall having a first disc 86 defining at least one first aperture 86A and a second disc 87 defining at least one second aperture 87A. The first disc 86 is rotatable relative to the second disc 87. The at least one first aperture 86A is in register with the at least one second aperture 87A in the open position. The at least one first aperture 86A is circumferentially offset from the at least one second aperture 87A in the closed position. The thrust wall is shown in the closed position in FIG. 3. It will be appreciated that the at least one first aperture may include a plurality of first apertures 86A circumferentially distributed about a rotation axis of the first disc 86 and the at least one second aperture 87A may include a plurality of second apertures 87A circumferentially distributed about the rotation axis. In the closed position, the first apertures are all offset from the second apertures. In the open position, the first apertures are at least partially in register with the second apertures to fluidly connect the first apertures to the second apertures and to allow fluid communication through the thrust wall.

The first disc 86 has a shaft 86B that may be drivingly engaged to the combustion engine 2. In other words, rotation of the shaft of the combustion engine 2 may be used to rotate the shaft 86B of the first disc 86. The first disc 86 may alternatively be driven by an actuator (e.g., electric motor) operatively connected to the controller 100.

The DCT 8 operates along a sequence of events. The combustion gases received from the combustion engine 2, and the rotary units 21, may be in the form of pulses of combustion gases. These pulses may be received via the inlet 81 of the DCT 8 at a pulse frequency. Once a pulse of the combustion gases is received, fuel may be injected into the DCT 8 via the fuel injector 83. Then, the mixture of fuel and combustion gases may flow through the member 85. The member 85 may then move from the open position to the closed position to isolate a portion of the DCT 8 from the combustion engine 2. The igniter 84 may then be powered to ignite the mixture of fuel and combustion gases to generate exhaust gases that propagate in the direction D1 with the shock wave W1.

In the present embodiment, the time between the ignition and the shockwave propagating across the DCT 8 may be a very short period (e.g., in the order of a millisecond). The pulse frequency may range anywhere between 5 Hz to 1000 Hz. At the higher frequencies, detonations occur so fast that the combustion may seem continuous, which may smooth out vibrations. The thrust generated by the pulse detonation may be directly proportional to the detonation frequency.

After the detonation wave propagation, it may be necessary to purge the air such that the pressure in the detonation tube is lower than the pressure coming from the combustion engine 2 to prevent any reverse propagation. In the present embodiment, the air is going to be naturally scavenged during the opening of the rotating disc by the higher pressure coming from the combustion engine. A pressure inside the DCT 8 may decrease rapidly following the supersonic propagating combustion wave.

Once it is desired to use the DCT 8, the controller 100 may, in response to receiving of a command, inject the fuel into the DCT 8 via the fuel injector 83, and once the member 85 is in the closed position, power the igniter 84 to ignite the mixture of the combustion gases and the fuel injected into the DCT 8 to detonate the mixture. The controller 100 may be operatively connected to one or more sensor(s) operable to determine when the member 85 is in the closed position to power the igniter 84 to ignite the mixture. This one or more sensor(s) may be any sensor operable to send a signal to the controller 100 indicative of a position of the member 85. The sensor may be operatively connected to the shaft 86B of the first disc 86 and may send a signal to the controller 100 when a circumferential position of the shaft 86B, and of the first disc 86, corresponds to the closed position.

The receiving of a command may be done, for instance, by receiving a signal from a switch 101 operatively connected to the controller 100. The controller 100 is operatively connected to the aircraft power plant 1. Alternatively, the receiving of the command may include receiving a signal from a power lever 102 operatively connected to the controller 100 of the aircraft power plant 1. The signal is indicative that a power requirement of the aircraft power plant 1 is above a power threshold of the aircraft power plant 1 when the DCT 8 is turned off. In other words, the power lever 102 may be gradated from 0 to 100% of a maximum power of the aircraft power plant 1. In some embodiments, the maximum power may be achieved solely with the help of the DCT 8. Therefore, when a position of the power lever 102 is beyond a certain value (e.g., 80% of the maximum power), the controller 100 triggers the activation of the DCT 8 since the aircraft power plant 1 may not be able to reach more than 80% of its maximum power without the DCT 8.

The controller 100 may be configured to inject the fuel into the DCT 8 at fuel injection events in which fuel is injected into the DCT 8 via the fuel injector 83. The fuel injection events occur at an injection frequency that may correspond to the pulse frequency of pulses of the combustion gases generated by the combustion engine and entering the DCT 8. The fuel injection events may occur between the pulses of the combustion gases. In other words, the fuel injection events may be out of phase with the pulses of the combustion gases entering the DCT 8. The controller 100 may be configured to move the member 85 between the open position and the closed position at a frequency corresponding to the injection frequency.

In the embodiment shown, proper phasing between the receiving of the pulses of the combustion gases within the DCT 8 and the opening and closing of the member 85 may be required. To do so, the shaft 86B of the first disc 86 of the thrust wall may be drivingly engaged to the combustion engine 2 via the gearbox 6. The controller 100 may be operatively connected to the gearbox 6 and may be configured to adjust a speed ratio between the shaft 3 of the combustion engine 2 and the first disc 86 such that a frequency at which the member moves from the open position to the closed position corresponds to the pulse frequency of the pulses of the combustion gases generated by the combustion engine 2. The controller 100 may determine this speed ratio and operate the gearbox 6 at this determined speed ratio. The moving of the member 85 from the open position to the closed position may be done after the combustion gases are received into the DCT 8, after the fuel has been injected into the DCT 8 via the fuel injector 83, and before the igniter 84 is powered.

All of the different steps—opening and closing of the thrust wall, receiving of the combustion gases, powering the igniter, injecting the fuel—may all occur sequentially and may be spaced apart from one another by a few milliseconds. To the naked eye, all of those steps may appear simultaneous.

In the embodiment shown, the combustion engine 2 of the aircraft power plant 1, which may correspond to the rotary engine 10, may be operated with different type of combustion schemes. Amongst one of them, the direct injection with diffusion combustion promotes the usage of a lambda ($\lambda$) value above 1. The lambda is referred to as the air-fuel equivalence ratio and is a ratio of the actual air-fuel ratio to the stoichiometric air-fuel ratio. The lambda is defined as follows:

$$\lambda = \frac{AFR}{AFR_{stoich}}$$

$$AFR(\text{air fuel ratio}) = \frac{m_{air}}{m_{fuel}}$$

Where $m_{air}$ and $m_{fuel}$ are the mass flow rate of air and the mass flow rate of fuel, respectively. Thus, the air-fuel equivalence ratio is derived by dividing a ratio of an actual mass flow rate of air supplied to the combustion engine 2 to an actual mass flow rate of fuel supplied to the combustion engine 2 by a stoichiometric ratio of a mass flow rate of air to a mass flow rate of fuel required to obtain a stoichiometric reaction of combustion in which there is no excess of air and no excess of fuel. Typically, the rotary engine 10 is operated with a lambda above 1. This means that more oxygen is supplied to the combustion chambers of the rotary engine 10 than necessary for combustion of the fuel injected into those combustion chambers. This may also be referred to as a "lean" mixture.

The excess of unburned oxygen in the exhaust gases exiting the rotary engine 10 may allow for the addition of the detonation combustion tube 8. The detonation combustion tube 8 may allow for oxidation of excess air by the injection of fuel downstream of the rotary engine 10 and upstream of the turbine 5. This may result in an increase of a temperature of the exhaust gases thereby allowing more work extraction from the turbine 5. Since the aircraft power plant 1 is turbo-compounded, more power may be transferred from the turbine 5 to the shaft 3, herein via the gearbox 6. Hence, for the same level of work output, the size of the core (e.g., rotary engine 10, turbine 5) may be reduced with the usage of the detonation combustion tube 8. This may allow the aircraft power plant 1 to generate sufficient power for most operating conditions (e.g., cruise) with the detonation combustion tube turned off and to generate sufficient power when higher power is required (e.g., take-off) with the detonation combustion tube 8 turned on. Thus, the combustion engine 2 may be sized so as to be able to satisfy a power requirement of most operating conditions instead of being sized to satisfy the most extreme power requirements. Weight and efficiency gains may be possible with the disclosed aircraft power plant 1.

The controller 100 may therefore be configured to operate the combustion engine 2 at an air-fuel equivalence ratio being greater than one. This implies that excess and unburned oxygen is present in the pulses of the combustion gases received within the DCT 8. The DCT 8 may thus be devoid of a dedicated air inlet. In other words, the only air that is received into the DCT 8 may flow through the combustion engine 2 and may correspond to excess air that was not required for combustion of the fuel injected into the combustion chamber(s) of the combustion engine 2. In some embodiments, it may be possible to directly add air to the DCT 8 via a dedicated inlet. This air may come an environment outside the aircraft power plant 1 (e.g., scoop inlet). This air may come from the compressor 4 (FIG. 1).

Although the turbine 5 has been depicted as being downstream of the DCT 8, in an alternate embodiment, the turbine 5 may be located upstream of the DCT 8, between the combustion engine 2 and the DCT 8. This alternate position of the turbine 5 is shown in dashed line and referred to with reference numeral 5'.

In an alternate embodiment, the aircraft power plant 1 may include a plurality of DCT 8 each in fluid communication with a respective one of the rotary units 21 of the rotary engine or in fluid communication with a respective cylinder of a piston engine. These DCTs 8 may be circumferentially distributed and configured to feed the pulses of the exhaust gases to the turbine 5 at a plurality of circumferential positions.

Figure 4:
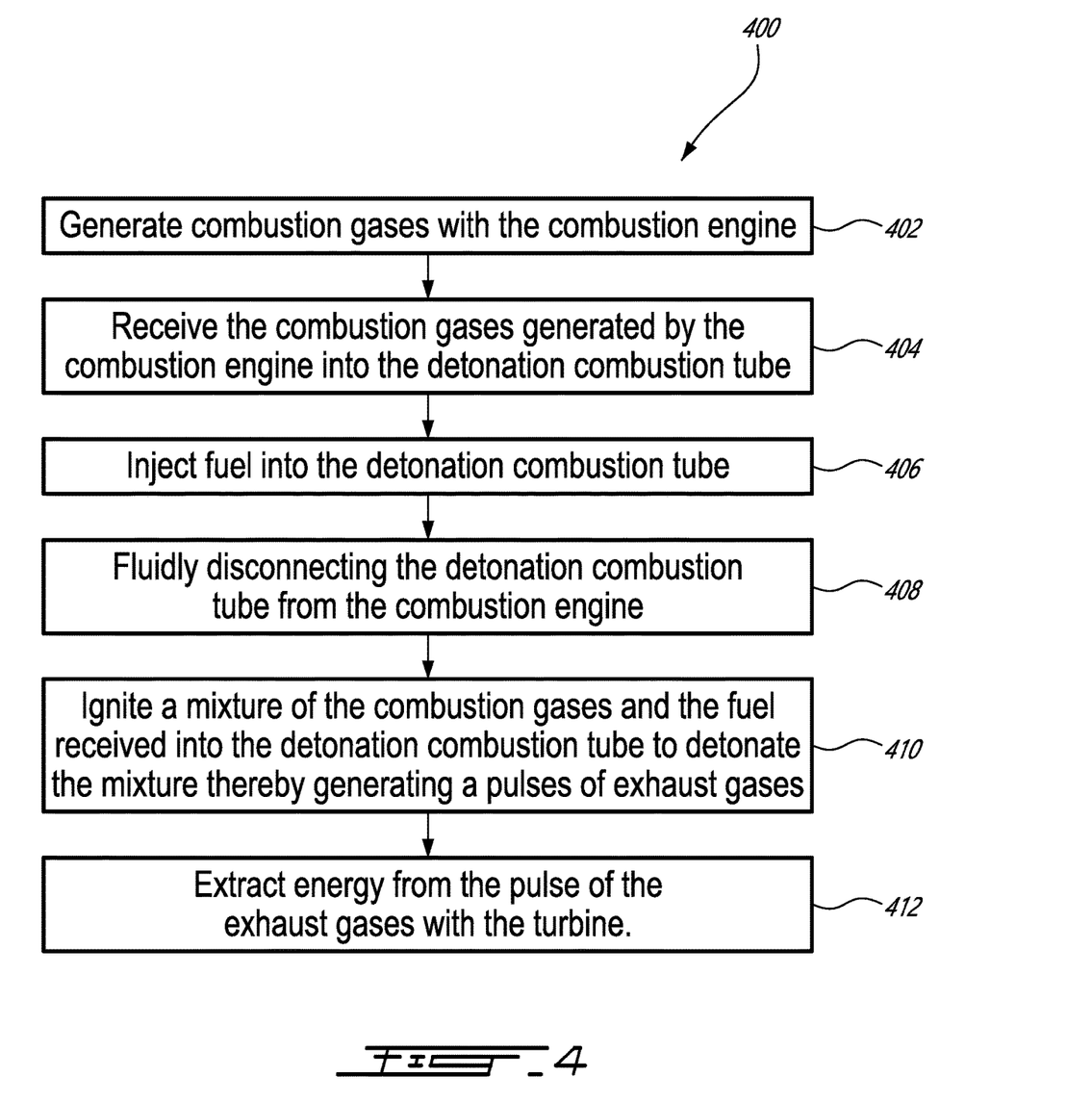
FIG. 4 is a flowchart illustrating steps of a method of operating the aircraft power plant of FIG. 1.

Referring now to FIG. 4, a method of operating the aircraft power plant 1 is shown at 400 and includes: generating combustion gases with the combustion engine 2 at 402; receiving the combustion gases generated by the combustion engine 2 into the detonation combustion tube 8 at 404; injecting fuel into the detonation combustion tube 8 at 406; fluidly disconnecting the detonation combustion tube 8 from the combustion engine 2 at 408; igniting a mixture of the combustion gases and the fuel received into the detonation combustion tube 8 to detonate the mixture thereby generating pulses of exhaust gases at 410; and extracting energy from the pulses of the exhaust gases with the turbine 5 at 412.

All of the above steps 402, 404, 406, 408, 410, and 412 may occur sequentially, one after the other, and are repeated periodically for each cycle of combustion occurring in the combustion engine 2. These steps may be timely spaced apart from one another by one to a few milliseconds.

In the embodiment shown, the receiving of the combustion gases at 404 includes receiving pulses of the combustion gases at a pulse frequency, the injecting of the fuel into the detonation combustion tube 8 at 406 includes injecting the fuel into the detonation combustion tube 8 at fuel injection events having an injection frequency corresponding to the pulse frequency. The fuel injection events occur between the pulses.

The fluidly disconnecting of the detonation combustion tube 8 from the combustion engine 2 at 408 may include moving the member 85 from the open position in which in which the outlet of the combustion engine 2 is fluidly connected to the turbine 5 to a close position in which the combustion engine 2 is fluidly disconnected from the turbine 5 by the member 85. The moving of the member 85 from the open position to the closed position may include rotating the first disc 86 relative to the second disc 87 until the at least one first aperture 86A is offset from the at least one second aperture 87A. The method 400 may include determining a speed ratio between the first disc 86 and the shaft 3 of the combustion engine 2 such that a frequency at which the member 85 moves from the open position to the closed position corresponds to a pulse frequency of the pulses of the combustion gases generated by the combustion engine 2. The gearbox 6 may then be operated at the speed ratio The receiving the combustion gases generated by the combustion engine 2 into the detonation combustion tube 8 at 404 may include converging the combustion gases outputted by the a plurality of rotary engine units 21 into the detonation combustion tube 8.

The generating of the combustion gases may include generating the combustion gases by operating the combustion engine 2 at an air-fuel equivalence ratio being greater than one. The method 400 may include injecting air into the detonation combustion tube solely through the combustion engine 2. The air may thus be excess air present in the combustion gases.

The DCT 8 may improve the fuel efficiency of the aircraft power plant 1 and may reduce fuel emission. The DCT 8 may allow down rating the combustion engine 2 and/or may allow the skipping of injection to use unburned oxygen for combustion into the DCT 8. This may reduce heat rejection of the rotary units 21. In other words, it may be cumbersome to evacuate heat generated by the rotatory units 21. Typically, coolant and heat exchangers are used for this purpose. The DCT 8 may allow the reduction of size and weight of those heat exchangers by down rating the rotary units 21 and by compensating this down rating by an increase of power generated by the DCT 8.

The DCT 8 may reduce the need for expensive hardware and may contribute in making the engine lighter. The DCT 8 may provide an increase enthalpy for the turbine 5 for more work recovery. Burning fuel by detonation may allow for more energy to be gained from the same amount of fuel compared to typical combustion methods. This may thus increase power output and efficiency of the aircraft power plant 1.

Figure 5:
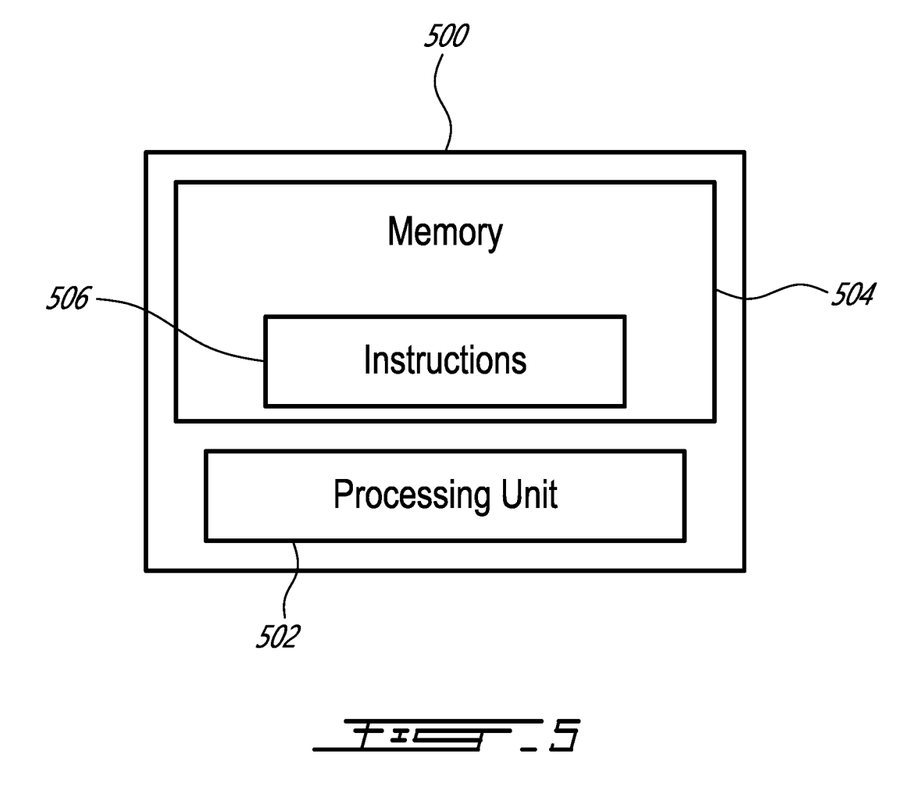
FIG. 5 is a schematic representation of a controller of the aircraft power plant of FIG. 1.

With reference to FIG. 5, an example of a computing device 500 is illustrated. For simplicity only one computing device 500 is shown but the system may include more computing devices 500 operable to exchange data. The computing devices 500 may be the same or different types of devices. The controller 100 may be implemented with one or more computing devices 500. Note that the controller 100 can be implemented as part of a full-authority digital engine controls (FADEC) or other similar device, including electronic engine control (EEC), engine control unit (ECU), electronic propeller control, propeller control unit, and the like. In some embodiments, the controller 100 is implemented as a Flight Data Acquisition Storage and Transmission system, such as a FAST™ system. The controller 100 may be implemented in part in the FAST™ system and in part in the EEC. Other embodiments may also apply.

The computing device 500 comprises a processing unit 502 and a memory 504 which has stored therein computer-executable instructions 506. The processing unit 502 may comprise any suitable devices configured to implement the method 400 such that instructions 506, when executed by the computing device 500 or other programmable apparatus, may cause the functions/acts/steps performed as part of the method 400 as described herein to be executed. The processing unit 502 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 504 may comprise any suitable known or other machine-readable storage medium. The memory 504 may comprise non-transitory computer readable storage medium, for example, but not limited to, an electronic, magnetic, optical, electromagnetic, infrared, or semiconductor system, apparatus, or device, or any suitable combination of the foregoing. The memory 504 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 504 may comprise any storage means (e.g., devices) suitable for retrievably storing machine-readable instructions 506 executable by processing unit 502.

The methods and systems described herein may be implemented in a high level procedural or object oriented programming or scripting language, or a combination thereof, to communicate with or assist in the operation of a computer system, for example the computing device 500. Alternatively, the methods and systems described herein may be implemented in assembly or machine language. The language may be a compiled or interpreted language. Program code for implementing the methods and systems described herein may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems described herein may also be considered to be implemented by way of a non-transitory computer-readable storage medium having a computer program stored thereon. The computer program may comprise computer-readable instructions which cause a computer, or more specifically the processing unit 502 of the computing device 500, to operate in a specific and pre-defined manner to perform the functions described herein, for example those described in the method 400.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An aircraft power plant, comprising:
a combustion engine having an outlet outputting combustion gases;
a turbine located downstream of the combustion engine relative to the combustion gases;
a detonation combustion tube fluidly connecting the combustion engine to the turbine, the detonation combustion tube having a tube inlet and a tube outlet;
a member disposed within the detonation combustion tube downstream of the tube inlet and upstream of the tube outlet, the member having an open position in which the tube inlet is fluidly connected to the tube outlet through the member and a closed position in which the tube inlet is fluidly disconnected from the tube outlet by the member;
a fuel injector fluidly connected to the detonation combustion tube downstream of the outlet of the combustion engine;
an igniter located downstream of the member and operatively connected to the detonation combustion tube; and
a controller operatively connected to the fuel injector and to the igniter, the controller configured to, in response to receiving of a command:
a) inject a fuel into the detonation combustion tube via the fuel injector, b) once the member is in the closed position, power the igniter to ignite a mixture of the combustion gases and the fuel injected into the detonation combustion tube, and c) repeat steps a) and b) for each of a plurality of successive cycles of combustion sequentially occurring one after the other.

2. The aircraft power plant of claim 1, wherein the controller is configured to:

inject the fuel into the detonation combustion tube at fuel injection events in which fuel is injected into the detonation combustion tube via the fuel injector, the fuel injection events occurring at an injection frequency corresponding to a pulse frequency of pulses of the combustion gases generated by the combustion engine and entering the detonation combustion tube, the fuel injection events occurring between the pulses of the combustion gases.

3. The aircraft power plant of claim 2, wherein the controller is operatively connected to the member and configured to:

move the member between the open position and the closed position at a frequency corresponding to the injection frequency.

4. The aircraft power plant of claim 3, wherein the member is a thrust wall having a first disc defining at least one first aperture and a second disc defining at least one second aperture, the first disc rotatable relative to the second disc, the at least one first aperture being in register with the at least one second aperture in the open position, the at least one first aperture being circumferentially offset from the at least one second aperture in the closed position.

5. The aircraft power plant of claim 4, wherein the first disc is drivingly engaged to the combustion engine.

6. The aircraft power plant of claim 5, wherein the first disc is drivingly engaged to the combustion engine via a gearbox.

7. The aircraft power plant of claim 6, wherein the controller is operatively connected to the member via the gearbox, the controller being configured to:

determine a required speed ratio between the first disc and a shaft of the combustion engine such that a frequency at which the member moves from the open position to the closed position corresponds to the pulse frequency of the pulses of the combustion gases generated by the combustion engine; and operate the gearbox at the required speed ratio.

8. The aircraft power plant of claim 1, wherein the combustion engine includes a plurality of rotary engine units, a manifold having a plurality of manifold inlets fluidly connected to a manifold outlet, each of the plurality of rotary engine units fluidly connected to a respective one of the plurality of manifold inlets, the manifold outlet fluidly connected to the tube inlet of the detonation combustion tube.

9. The aircraft power plant of claim 1, wherein the fuel injector is an electrically-controllable injector.

10. The aircraft power plant of claim 1, wherein the fuel injector is located upstream of the member.

11. The aircraft power plant of claim 1, wherein the controller is configured to operate the combustion engine at an air-fuel equivalence ratio being greater than one.

12. The aircraft power plant of claim 11, wherein the detonation combustion tube is devoid of a dedicated air inlet.

13. A method of operating an aircraft power plant having a detonation combustion tube fluidly connecting a combustion engine to a turbine, the method comprising:

generating combustion gases with the combustion engine;

receiving the combustion gases generated by the combustion engine into the detonation combustion tube via a tube inlet of the detonation combustion tube;

injecting fuel into the detonation combustion tube; and a) fluidly disconnecting the tube inlet from a tube outlet of the detonation combustion tube;

b) igniting a mixture of the combustion gases and the fuel received into the detonation combustion tube to detonate the mixture thereby generating a pulse of exhaust gases;

c) extracting energy from the pulse of the exhaust gases with the turbine; and d) repeating steps a) to c) for each of a plurality of successive cycles of combustion sequentially occurring one after the other.

14. The method of claim 13, wherein the receiving of the combustion gases includes receiving pulses of the combustion gases at a pulse frequency, the injecting of the fuel into the detonation combustion tube includes injecting the fuel into the detonation combustion tube at fuel injection events having an injection frequency corresponding to the pulse frequency, the fuel injection events occurring between the pulses of the combustion gases.

15. The method of claim 14, wherein the fluidly disconnecting of the detonation combustion tube from the combustion engine includes moving a member from an open position in which in which an outlet of the combustion engine is fluidly connected to the turbine to a closed position in which the combustion engine is fluidly disconnected from the turbine by the member.

16. The method of claim 15, wherein the member is a thrust wall having a first disc defining at least one first aperture and a second disc defining at least one second aperture, the moving of the member from the open position to the closed position includes rotating the first disc relative to the second disc until the at least one first aperture is offset from the at least one second aperture.

17. The method of claim 16, wherein the first disc is drivingly engaged to the combustion engine via a gearbox, the method comprising determining a speed ratio between the first disc and a shaft of the combustion engine such that a frequency at which the member moves from the open position to the closed position corresponds to the pulse frequency of the pulses of the combustion gases generated by the combustion engine, and operating the gearbox at the speed ratio.

18. The method of claim 13, wherein the receiving the combustion gases generated by the combustion engine into the detonation combustion tube includes converging the combustion gases outputted by a plurality of rotary engine units into the detonation combustion tube.

19. The method of claim 13, wherein the generating of the combustion gases includes generating the combustion gases by operating the combustion engine at an air-fuel equivalence ratio being greater than one.

20. The method of claim 19, comprising injecting air into the detonation combustion tube solely through the combustion engine, the air being excess air present in the combustion gases.

* * * * *